Oct. 14, 1952 P. O. JORDAN 2,614,202
AIR CONDITIONING APPARATUS
Filed May 25, 1950 2 SHEETS—SHEET 1

INVENTOR
PAUL O. JORDAN
BY G. H. Braddock
ATTORNEY

Oct. 14, 1952 P. O. JORDAN 2,614,202
AIR CONDITIONING APPARATUS
Filed May 25, 1950 2 SHEETS—SHEET 2
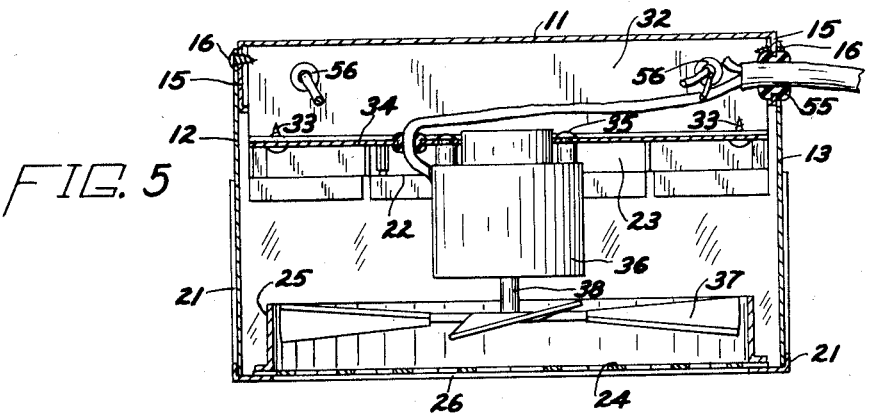
FIG. 5
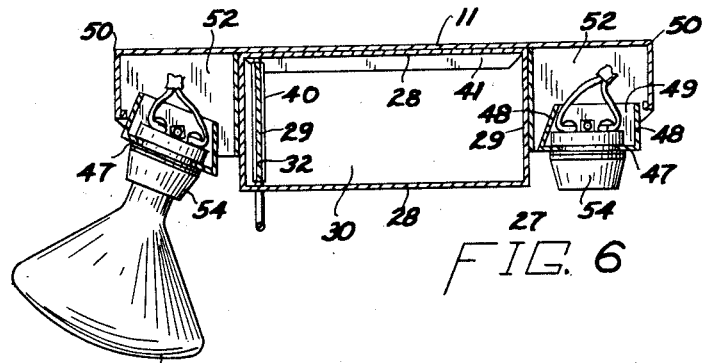
FIG. 6
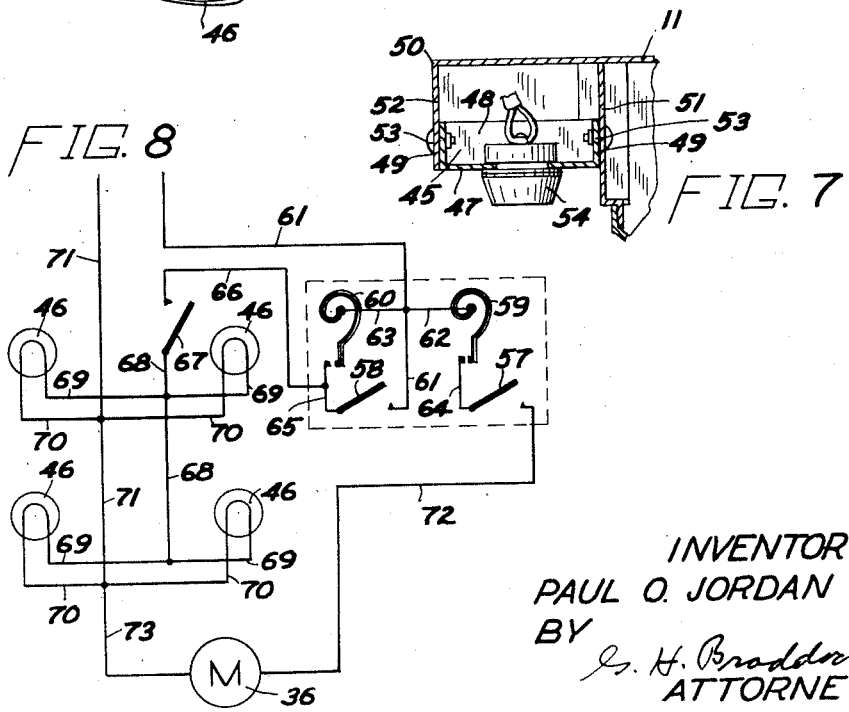
FIG. 8
FIG. 7
INVENTOR
PAUL O. JORDAN
BY G. H. Braddock
ATTORNEY Patented Oct. 14, 1952

2,614,202

UNITED STATES PATENT OFFICE 2,614,202

AIR CONDITIONING APPARATUS

Paul Otto Jordan, Hudson, Wis.

Application May 25, 1950, Serial No. 164,069

8 Claims. (Cl. 219—39)

1

The invention herein presents an air conditioning apparatus useful for many purposes but devised to be especially useful for ventilating and warming outbuildings, such, for example, as farm milk houses.

The air conditioning apparatus is constituted as a hollow body containing an electric motor and a fan for circulating air, supporting adjustable members with which heating lamps are assembled, and providing a housing for lead wires to the electric motor and heating lamps.

The object of the invention is to provide an air conditioning apparatus of the character as stated wherein will be incorporated simple, inexpensive, practical, efficient, novel and improved features of construction.

In the accompanying drawings forming a part of this specification,

Fig. 5 is an enlarged transverse sectional view, taken on line 5—5 in Fig. 2;

Fig. 6 is an enlarged transverse sectional view, taken on line 6—6 in Fig. 2;

Fig. 7 is a detail sectional view, taken on line 7—7 in Fig. 2; and

Fig. 8 is a wiring diagram of an electrical system for the air conditioning apparatus.

Figure 1:
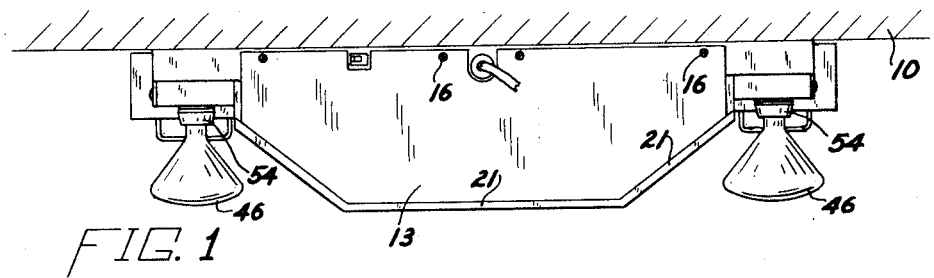
Fig. 1 is a side elevational view of an air conditioning apparatus made according to the invention as when applied to use.
Figure 2:
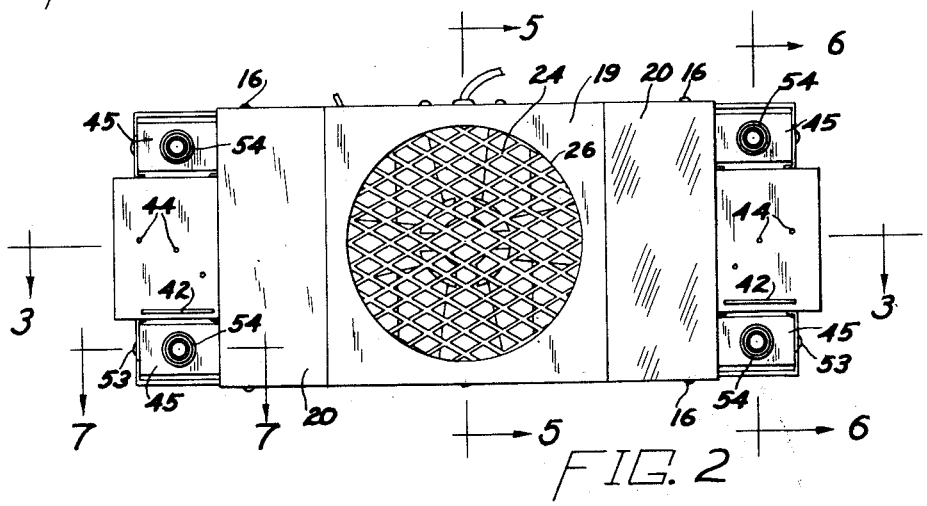
Fig. 2 is an enlarged bottom plan view of the air conditioning apparatus.
Figure 3:
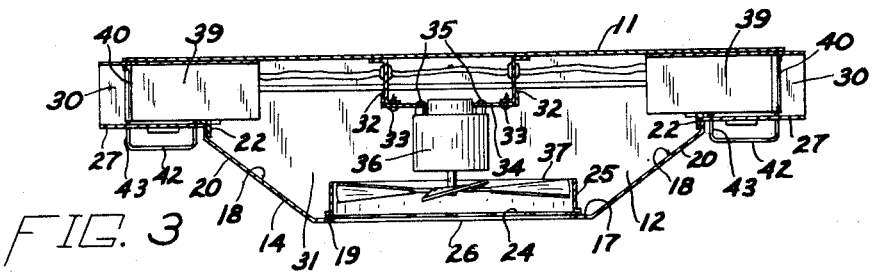
Fig. 3 is a central longitudinal sectional view, taken on line 3—3 in Fig. 2.
Figure 4:
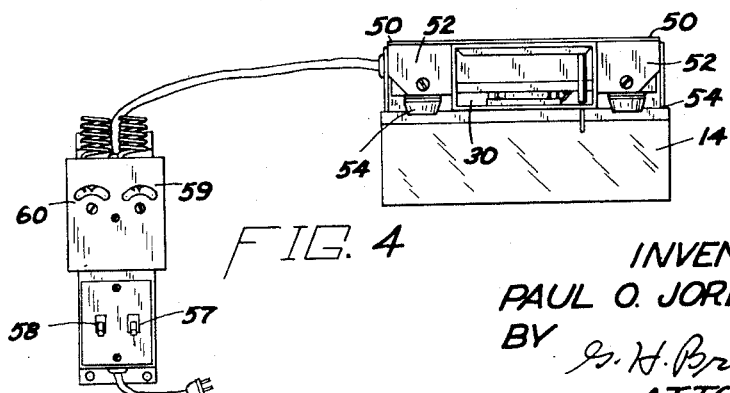
Fig. 4 is an end elevational view of said air conditioning apparatus, additionally disclosing manually actuable electric switches and thermostats for employment with the apparatus.

Speaking generally, the new and improved air conditioning apparatus consists of a hollow body containing an electric motor and a fan for circulating air, supporting adjustable members with which heating lamps of the air conditioning apparatus are assembled, and providing a housing for lead wires of an electrical system in which said electric motor and heating lamps are adapted to be connected. In practical use, the hollow body of said air conditioning apparatus ordinarily will be supported, in any suitable and convenient manner, upon a building structure, as from a ceiling 10, such as the ceiling of a farm milk house or other outbuilding.

A hollow body of the air conditioning apparatus is constituted as an elongated structure consisting of a first base wall 11, spaced, parallel side walls, denoted 12 and 13, respectively, and a second base wall 14.

2

The first base wall 11 is of rectilinear configuration and includes parallel, interiorly extending flanges 15 at the opposite side edges thereof and in perpendicular relation thereto.

The spaced, parallel side walls 12 and 13 are secured, as at 16, to the flanges 15 to extend away from the first base wall 11 in perpendicular relation thereto. An intermediate part 17 of the edge of each of the side walls 12 and 13 spaced from the first base wall 11 is in parallel relation to said first base wall, and opposite end parts 18, 18 of the edge of each of said side walls spaced from said first base wall slant obliquely from the opposite ends of the corresponding intermediate part 17 toward the first base wall. The end parts 18, 18 are all disposed at the same angular relation to said first base wall, and said end parts are of equal length and of such length that their outer ends terminate at locations equidistantly spaced from the first base wall.

The second base wall 14 also is of rectilinear configuration. It includes a central portion 19 fitted up against the intermediate parts 17 of the edges of the side walls 12 and 13 spaced from the first base wall 11, opposite end portions 20, 20 fitted up against the opposite end parts 18, 18 of the edges of said side walls spaced from said first base wall, and flanges 21 at the opposite side edges of said central and end portions 19, 20, 20 fitted over external surfaces of marginal portions of said side walls 12 and 13 adjacent the edge parts 17, 18, 18. The opposite ends 22 of the second base wall 14 terminate in equally spaced relation to the first base wall 11 at locations adjacent the opposite ends of the edges of the side walls 12 and 13 including the intermediate and end parts 17, 18, 18, thus to provide openings 23 from the hollow body at the opposite ends thereof. A grill 24, surrounded by an annular element 25, is supported interiorly of and on the central portion 19 of the second base wall 14 adjacent an annular opening 26 through said central portion, and save for an air inlet provided by the annular opening 26 and the grill 24 and air outlets provided by open ended box-like members 27 one of which is contiguous with each of the openings 23, the hollow body is closed. The annular element 25 is situated centrally of the second base wall 14 at the inner side of the grill 24.

Each open ended box-like member 27 is constituted as spaced, parallel rectilinear side and end walls, represented 28 and 29, respectively, and is situated at the transverse center of the first base wall 11 to extend exteriorly from the corresponding outlet 23 longitudinally of the hollow body. Interior ends of the side and end walls 28 and 29 of each box-like member 27 are secured in air tight manner to the hollow body in alined relation with the opening 23 at the corresponding end of said hollow body, and the open ended box-like members provide outlet passages 30 for air which are contiguous with a chamber 31 provided by the hollow body.

The interior surface of the first base wall 11 suitably and conveniently supports spaced straps 32 which extend in direction toward the second base wall 14 and are disposed transversely of the hollow body in the disclosure as made, and edge portions of said straps 32 spaced from said first base wall suitably and conveniently support, as at 33, a shelf 34 which extends transversely of the hollow body at the longitudinal center thereof. The shelf 34 in turn suitably and conveniently supports, as at 35, an electric motor 36 situated in the chamber 31 in spaced relation to the first and second base walls 11 and 14 and disposed concentrically of the annular element 25, and a circulating fan 37, fixed upon a driven shaft 38 of said electric motor, is situated within said annular element 25 and disposed in parallel, adjacent relation to the grill 24. The construction and arrangement will be such that when the circulating fan 37 is rotated, air will be drawn or sucked into the chamber 31 by way of the annular opening 26 and the grill 24 and delivered under pressure into the interior ends of each of the box-like members 27.

A damper in the exterior end portion of the outlet passage 30 through each box-like member 27 is constituted as a flat strip of material 39 rotatably supported, as at 40, on the side walls 28, 28 of the box-like member adjacent an end wall 29 and adapted to be selectively adjusted to position crosswise of the corresponding passage 30 to partially or totally preclude passage of air forced by the circulating fan 37, or to position longitudinally of the hollow body to permit free passage of air from the air conditioning apparatus. An interiorly extending lip 41 at the exterior end of each outlet passage 30 is for limiting rotative movement of the flat strip 39 of the corresponding damper outwardly of the outlet passage, and a hand piece 42, rigid with the axis of each damper and situated exteriorly of the corresponding box-like member 27, is for rendering the damper readily and easily manually rotatably adjustable. Each hand piece 42 includes a finger 43 capable of insertion in any one of spaced apertures 44 in one of the side walls 28, thus to stably retain the flat strip 39 of the corresponding damper in desired adjusted partially open or completely closed position.

Assuming both dampers to be in wide open position, air will be forced, in response to rotation of the circulating fan 37, in equal amount out of both of the open ended box-like members 27. That is, rotation of said circulating fan will cause air to be drawn or sucked into the chamber 31 by way of the annular opening 26 and the grill 24 and out of the outlet passages 30 in equal amount when both dampers are wide open. When either damper is in completely closed position and the other damper is partially or wide open, the only air forced out of the apparatus will be that which passes through the outlet passage 30 in which the partially or wide open damper is situated. When both dampers are in partially open position, or one of the dampers is wide open and the other is partially open, the amount of air forced out of each outlet passage of course will be dependent upon, or a function of, the extent to which the damper is open. Thus, the amount of air permitted to pass out of the opposite ends, respectively, of the hollow body of the air conditioning apparatus can be nicely controlled and regulated by adjustment of the dampers in the outlet passages 30.

The apparatus includes four members, each designated 45, for supporting heating lamps 46, there being a member 45 disposed at each of the four corners of said apparatus. It is to be understood, however, that an air conditioning apparatus made according to the invention can include a greater or less number of lamp supporting members. As disclosed, each member 45 supports a single heating lamp 46.

Each of the heating lamp supporting members 45 is constituted as a base 47, side walls 48 extending away from opposite side edges of said base 47, and parallel end walls 49 contiguous with the opposite ends, respectively, of the base 47 and the side walls 48. Each member 45 is open at its side opposite its base.

The members 45 are situated beneath overhanging ledges 50, constituted as integral parts of the first base wall 11 at the four corners thereof, there being a member 45 at each of the opposite sides of each box-like member 27. Each ledge 50 is constructed to provide spaced, parallel side walls, denoted 51 and 52, respectively, one adjacent the hollow body of the apparatus and the other in spaced relation to said hollow body, in perpendicular relation to and extending transversely of said first base wall 11, and each member 45 is supported upon a set of side walls 51 and 52 for rotative movement transversely of the hollow body. More explicity stated, each of the end walls 49, 49 of each heating lamp supporting member 45 is mounted upon a pivot element 53 situated in the side walls 51, 52 of the corresponding ledge 50 for rotative movement in a plane extending transversely of the first and second base walls 11 and 14. The construction and arrangement will be such that the members 45 will be free for limited rotative movement toward and away from the box-like members 27. The construction and arrangement also will be such that the end and side walls 49, 51 and 49, 52 will be grasped against each other under sufficient friction or tension so that said members 45 will remain at any position to which they may be rotatably adjusted. As disclosed, the pivot elements 53 are headed and nutted bolts. Desirably, when the bases 47 of the members 45 are parallel to the first base wall 11, said bases may lie in a single plane and at the opposite sides of intermediate portions of the box-like members 27.

The base 47 of each member 45 supports a receptacle 54 adapted to receive a heating lamp 46. The receptacles 54 can be duplicates and each can be assembled with its corresponding base 47 in the same manner as all of the others. As shown, each heating lamp receptacle 54 is constituted as an insulating block disposed interiorly of the corresponding member 45 and a lamp receiving shell disposed exteriorly of said member 45. The heating lamp receptacles 54 may be assembled with the bases 47 in the manner as disclosed in my pending application Serial No. 119,829, for Heat Fixture, filed October 6, 1949.

One of the flanges 15 on the first base wall 11 suitably and conveniently supports an insulating bushing 55, and the straps 32 also support insulating bushings 56, for the passage of lead wires to the electric motor and to the heating lamps.

A first switch for manually turning current for the electric motor 36 off and on is indicated 57, a second switch for manually turning current for the heating lamps 46 off and on is represented 58, a first thermostat for controlling current to said electric motor is denoted 59, and a second thermostat for controlling current to said heating lamps is designated 60.

An incoming wire 61 from a source (not shown) of electrical energy extends to a fixed contact element of the switch 58, and lead wires, denoted 62 and 63, respectively, connect said incoming wire 61 with bi-metallic elements of the thermostats 59 and 60. A lead wire 64 extends between a fixed contact element of the thermostat 59 and a movable contact element of the switch 57, and a lead wire 65 extends between a fixed contact element of the thermostat 60 and a movable contact element of the switch 58.

A lead wire 66 extends from the lead wire 65 to a third manually actuable switch 67, a lead wire 68 extends from said third switch 67 by way of lead wires 69 to each of the heating lamps 46, and lead wires 70 extend from each of said heating lamps to an incoming wire 71.

A lead wire 72 extends from a fixed contact element of the switch 57 to the electric motor 36, and a lead wire 73 extends from said electric motor to the incoming wire 71.

All of the lead wires to the electric motor and the heating lamps will be situated within the housing provided by the hollow body of the apparatus.

The construction and arrangement will be such that the fixed and movable contact elements of the thermostat 59 will become engaged in response to increase in temperature, thus to close the circuit for the electric motor, including the first switch 57, to cause the circulating fan to become operative, and disengaged in response to decrease in temperature, thus to break the circuit for said electric motor to cause said circulating fan to become inoperative. Also, the construction and arrangement will be such that the fixed and movable contact elements of the thermostat 60 will become engaged in response to decrease in temperature, thus to close the circuit for the heating lamps, including the second and third switches 58 and 67, and cause said heating lamps to be energized, and disengaged in response to increase in temperature, thus to break the circuit for the heating lamps and cause them to be deenergized.

It will be apparent that the electric motor and heating lamp circuits can be concurrently closed to cause the electric motor and circulating fan to be operative while the heating lamps are energized, or either circuit can be open to cause its included phenomenon to be inoperative while the other circuit is closed to cause its phenomenon to be operative. And, too, the thermostats can be independently adjustably set to cause the electric motor to become operative and inoperative, and the heating lamps to become energized and deenergized, within any temperature range which may be predeterminedly selected. The circulating fan can be operative at any room temperature which may seem desirable, and the heating lamps can be energized and deenergized at will, independent of whether or not the circulating fan is, at some particular time or other, operative or inoperative.

The heating lamp supporting members 45 of course are rotatably adjustable, in the manner as hereinbefore set forth, to the end that heat from said heating lamps can be directed toward different locations of a room or space equipped with the air conditioning apparatus which may be selected. The heating lamps 46 are independently adjustable. In Fig. 6 of the drawings, the member 45 at the right is at adjusted position to cause a heating lamp when supported thereby to direct its heat perpendicularly outwardly from the apparatus, and the member 45 at the left is at adjusted position to cause the heating lamp which it supports to direct heat outwardly toward the left. Each of the members 45 will be capable of adjustment through an arc of sufficient magnitude to direct heat from lamps supported thereby toward distantly spaced locations of a room or space having the air conditioning apparatus.

What is claimed is:

1. An air conditioning apparatus comprising an elongated hollow body having an inlet opening at an intermediate portion thereof, members at intermediate portions of opposite ends of said elongated hollow body providing outlet passages therefrom, an electric motor supported within the elongated hollow body, a circulating fan in said elongated hollow body connected to said electric motor to be driven thereby, and heating lamp receptacles supported by and situated exteriorly of said hollow body at opposite sides of said members.

2. An air conditioning apparatus comprising an elongated hollow body having an inlet opening at an intermediate portion thereof, members at intermediate portions of opposite ends of said elongated hollow body providing outlet passages therefrom, an electric motor supported within the elongated hollow body, a circulating fan in said elongated hollow body fixed upon a shaft of the electric motor and disposed in adjacent relation to said inlet opening, heating lamp receptacles disposed exteriorly of the elongated hollow body at opposite sides of said members, and means supporting said heat lamp receptacles for adjustment relative to said elongated hollow body.

3. An air conditioning apparatus comprising an elongated hollow body having an inlet opening at an intermediate portion thereof, members at intermediate portions of opposite ends of said elongated hollow body providing outlet passages therefrom, a manually actuable damper in each of said outlet passages for controlling travel of air therethrough, an electric motor supported within the elongated hollow body, a circulating fan in said elongated hollow body connected to said electric motor to be driven thereby, and a heating lamp receptacle supported by and situated exteriorly of said hollow body at a side of each of said members.

4. An air conditioning apparatus comprising an elongated hollow body having an inlet opening at an intermediate portion thereof, members at intermediate portions of opposite ends of said elongated hollow body providing outlet passages therefrom, a manually adjustable damper in each of said outlet passages for controlling travel of air therethrough, an electric motor supported within the elongated hollow body, a circulating fan in said elongated hollow body fixed upon a shaft of said electric motor and disposed in adjacent relation to said inlet opening, heating lamp receptacles disposed exteriorly of the elongated hollow body at opposite sides of said members, and means supporting said heating lamp receptacles for rotatable adjustment relative to said elongated hollow body.

5. An air conditioning apparatus comprising a hollow body having an inlet opening, members at locations of said hollow body spaced from said inlet opening and from each other providing outlet passages from the hollow body, an electric motor, a circulating fan connected to said electric motor to be driven thereby, and a heating lamp receptacle supported by said hollow body and situated adjacent each of said members.

6. An air conditioning apparatus comprising a hollow body having an inlet opening, members at locations of said hollow body spaced from said inlet opening and from each other providing outlet passages from the hollow body, an electric motor, a circulating fan connected to said electric motor to be driven thereby, heating lamp receptacles supported by said hollow body and situated adjacent said members, and means supporting said heating lamp receptacles for adjustment relative to said hollow body.

7. In an air conditioning apparatus, a hollow body having an inlet opening, members at locations of said hollow body spaced from said inlet opening and from each other providing outlet passages from the hollow body, a manually adjustable damper in each of said outlet passages for controlling travel of air therethrough, an electric motor, a circulating fan connected to said electric motor to be driven thereby, and heating lamp receptacles supported by said hollow body and situated adjacent said members.

8. In an air conditioning apparatus, a hollow body having an inlet opening, members at locations of said hollow body spaced from said inlet opening and from each other providing outlet passages from the hollow body, a manually adjustable damper in each of said outlet passages for controlling travel of air therethrough, an electric motor, a circulating fan connected to said electric motor to be driven thereby, heating lamp receptacles supported by said hollow body and situated adjacent said members, and means supporting said heating lamp receptacles for adjustment relative to said hollow body.

PAUL OTTO JORDAN.

REFERENCES CITED

The following references are of record in the file of this patent:

UNITED STATES PATENTS

| Number | Name | Date |
| --- | --- | --- |
| 1,288,507 | Carmean et al. | Dec. 24, 1918 |
| 1,476,441 | Dion | Dec. 4, 1923 |
| 1,660,052 | Shepherd | Feb. 21, 1928 |
| 1,673,072 | Houghtby | June 12, 1928 |
| 2,139,250 | Zingone | Dec. 6, 1938 |
| 2,372,832 | Jepson | Apr. 3, 1945 |
| 2,428,090 | Naeher et al. | Sept. 30, 1947 |
| 2,439,005 | Jensen | Apr. 6, 1948 |
| 2,471,784 | Seifner et al. | May 31, 1949 |
| 2,480,363 | Hamer | Aug. 30, 1949 |